US008660372B2

(12) United States Patent
Bovik et al.

(10) Patent No.: US 8,660,372 B2
(45) Date of Patent: Feb. 25, 2014

(54) DETERMINING QUALITY OF AN IMAGE OR VIDEO USING A DISTORTION CLASSIFIER

(75) Inventors: Alan Bovik, Austin, TX (US); Anush Moorthy, Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 147 days.

(21) Appl. No.: 13/104,801

(22) Filed: May 10, 2011

(65) Prior Publication Data

US 2011/0274361 A1 Nov. 10, 2011

Related U.S. Application Data

(60) Provisional application No. 61/332,856, filed on May 10, 2010.

(51) Int. Cl.
| | | |
|---|---|---|
| *G06K 9/62* | (2006.01) | |
| *G06K 9/74* | (2006.01) | |
| *G06K 9/46* | (2006.01) | |
| *G06K 9/66* | (2006.01) | |
| *G06K 9/68* | (2006.01) | |
| *G06K 9/70* | (2006.01) | |
| *G06K 9/72* | (2006.01) | |

(52) U.S. Cl.
USPC ........... 382/228; 382/190; 382/227; 382/229; 382/218

(58) Field of Classification Search
None
See application file for complete search history.

(56) References Cited

U.S. PATENT DOCUMENTS

| 7,343,040 | B2* | 3/2008 | Chanas et al. ................ 382/172 |
| 7,715,597 | B2* | 5/2010 | Costache et al. ............. 382/118 |
| 7,844,117 | B2* | 11/2010 | Monga .......................... 382/190 |
| 2005/0256743 | A1 | 11/2005 | Dale |
| 2006/0182361 | A1 | 8/2006 | Ptucha et al. |
| 2008/0317358 | A1 | 12/2008 | Bressan et al. |
| 2009/0232409 | A1 | 9/2009 | Marchesotti |

OTHER PUBLICATIONS

A. Srivastava, et al., "On Advances in Statistical Modeling of Natural Images," Journal of Mathematical Imaging and Vision, 18, 2003, pp. 17-33.
Wilson S. Geisler, "Visual Perception and the Statistical Properties of Natural Scenes," ANRV331-PS59-10, ARI, Aug. 8, 2007, 30 pages.

(Continued)

*Primary Examiner* — Matthew Bella
*Assistant Examiner* — Thomas Conway
(74) *Attorney, Agent, or Firm* — Meyertons, Hood, Kivlin, Kowert & Goetzel, P.C.

(57) ABSTRACT

Techniques and structures are disclosed in which one or more distortion categories are identified for an image or video, and a quality of the image or video is determined based on the one or more distortion categories. The image or video may be of a natural scene, and may be of unknown provenance. Identifying a distortion category and/or determining a quality may be performed without any corresponding reference (e.g., undistorted) image or video. Identifying a distortion category may be performed using a distortion classifier. Quality may be determined with respect to a plurality of human opinion scores that correspond to a particular distortion category to which an image or video of unknown provenance is identified as belonging. Various statistical methods may be used in performing said identifying and said determining, including use of generalized Gaussian distribution density models and natural scene statistics.

21 Claims, 9 Drawing Sheets

(56) References Cited

OTHER PUBLICATIONS

Hamid Rahim Sheikh, et al., "An Information Fidelity Criterion for Image Quality Assessment Using Natural Scene Statistics," IEEE Transactions on Image Processing, vol. 14, No. 12, Dec. 2005, pp. 2117-2128.

Hamid Rahim Sheikh, et al., "No-Reference Quality Assessment Using Natural Scene Statistics: JPEG2000," IEEE Transactions on Image Processing, vol. 14, No. 11, Nov. 2005, pp. 1918-1927.

Qiang Li, et al., "Reduced-Reference Image Quality Assessment Using Divisive Normalization-Based Image Representation," IEEE Journal of Selected Topics in Signal Processing, vol. 3, No. 2, Apr. 2009, pp. 202-211.

Zhou Wang, Hamid R. Sheikh and Alan C. Bovik, "No-Reference Perceptual Quality Assessment of JPEG Compressed Images," Proceedings of IEEE 2002 International Conferencing on Image Processing, 2002, 4 pages.

Pina Marziliano, Frederic Dufaux, Stefan Winkler and Touradj Ebrahimi, "A No-Reference Perceptual Blur Metric," IEEE 2002 International Conference on Image Processing, 2002, 4 pages.

Aristidis C. Likas, et al., "A Variational Approach for Bayesian Blind Image Deconvolution," IEEE Transactions on Signal Processing, vol. 52, No. 8, Aug. 2004, pp. 2222-2233.

Aude Oliva, et al., "Modeling the Shape of the Scene: a Holistic Representation of the Spatial Envelope," International Journal of Computer Vision 42(3), 2001, pp. 145-175.

Junqing Chen, et al., "Adaptive Image Segmentation Based on Color and Texture," Proceedings on International Conference on Image Processing, 2002, 4 pages.

Karnran Sharifi and Alberto Leon-Garcia, "Estimation of Shape Parameter for Generalized Gaussian Distributions in Subband Decompositions of Video," IEEE Transactions on Circuits and Systems for Video Technology, vol. 5, No. 1, Feb. 1995, pp. 52-56.

Yoav Freund, et al., "A decision-theoretic generalization of on-line learning and an application to boosting," AT&T Bell Laboratories, Sep. 20, 1995, 34 pages.

Anush Moorthy, Alan Bovik, "Blind Image Quality Assessment: From Natural Scene Statistics to Perceptual Quality," IEEE Explorer, Apr. 25, 2011, 17 pages.

International Search Report in Application No. PCT/US2011/035930 dated Dec. 6, 2011, 3 pages.

\* cited by examiner

DETERMINING QUALITY OF AN IMAGE OR VIDEO USING A DISTORTION CLASSIFIER

CROSS-REFERENCE TO RELATED APPLICATIONS

This application claims the benefit of U.S. Provisional Application No. 61/332,856, filed on May 10, 2010.

STATEMENT OF FEDERALLY FUNDED RESEARCH

The subject matter of this disclosure was developed with U.S. Government support under Contract No. CCF-0728748 awarded by the National Science Foundation. The government has certain rights in this technology.

BACKGROUND OF THE INVENTION

1. Field of the Invention

This disclosure relates in general to the fields of processing images and videos, and more particularly, to determining a quality and/or correcting an image or video using a distortion classifier.

2. Description of the Related Art

Human perception of images and videos may differ greatly with regard to quality. For example, an uncompressed digital image frame may be perceived as having extremely high quality, while a highly compressed (lossy) digital image frame of the same scene may be considered as having low quality. The perceived low quality may be a direct result of distortion caused by the compression, and different distortions may affect images or videos in different ways.

Humans may be particularly adept at rating the quality of images or videos in which natural scenes (e.g., landscapes, animals, buildings, people, etc.) are depicted. Rating the quality of an image or video can be extremely expensive (both in terms of time and money), however, when human subjects are used. For example, if fifty subjects each rate the quality of a twenty minute video and are paid $5 apiece to do so, the cost of rating the video would be at least one thousand man-minutes and $250. Such a cost may be far too high to allow for quality ratings to be performed on a large number of images or videos.

SUMMARY

Various embodiments of methods, mechanisms, and structures relating to determining quality of an image or video are disclosed. In one embodiment, a method is disclosed, comprising a computer system identifying one or more distortion categories for one or more image frames, wherein the identifying is based on distorted image statistics for the one or more image frames, and the computer system determining a quality of the one or more image frames based on the identified one or more distortion categories, wherein reference image frames for the one or more image frames are not available to the computer system in performing the identifying and the determining.

In another embodiment, an apparatus comprising a processor and a storage device is disclosed, where the storage device has instructions stored thereon that are executable by the processor to cause the apparatus to perform operations including identifying one or more distortion categories for a first one or more image frames, wherein the identifying is based on distorted image statistics for the first one or more image frames, and wherein the distorted image statistics are derived from a natural scene statistics model, and wherein the operations include determining a quality of the first one or more image frames based on the identified one or more distortion categories, wherein the determining is based on a plurality of human-measured quality scores for a plurality of second one or more image frames, wherein each of the plurality of second one or more image frames are classified as being in at least one of the identified one or more distortion categories.

In another embodiment, a computer-readable storage medium is disclosed, wherein the storage medium has instructions stored thereon that are executable by a computer system to cause the computing device to perform operations comprising identifying one or more distortion categories for a first one or more image frames, wherein the identifying is based on distorted image statistics for the first one or more image frames, and determining a quality of the first one or more image frames based on the identified one or more distortion categories, wherein said determining is based on a plurality of human-measured quality scores for a plurality of second one or more image frames, wherein each of the plurality of second one or more image frames are classified as being in at least one of the identified one or more distortion categories.

These and other features and advantages will become apparent to those of ordinary skill in the art in view of the following detailed descriptions of the approaches presented herein. Additionally, the teachings of this disclosure, as well as the appended claims, are expressly not limited by the features and embodiments discussed above in this summary.

BRIEF DESCRIPTION OF THE DRAWINGS

Various embodiments are discussed herein with respect to FIGS. 1-8, as well as FIGS. 9-11.

DETAILED DESCRIPTION

Figure 1:
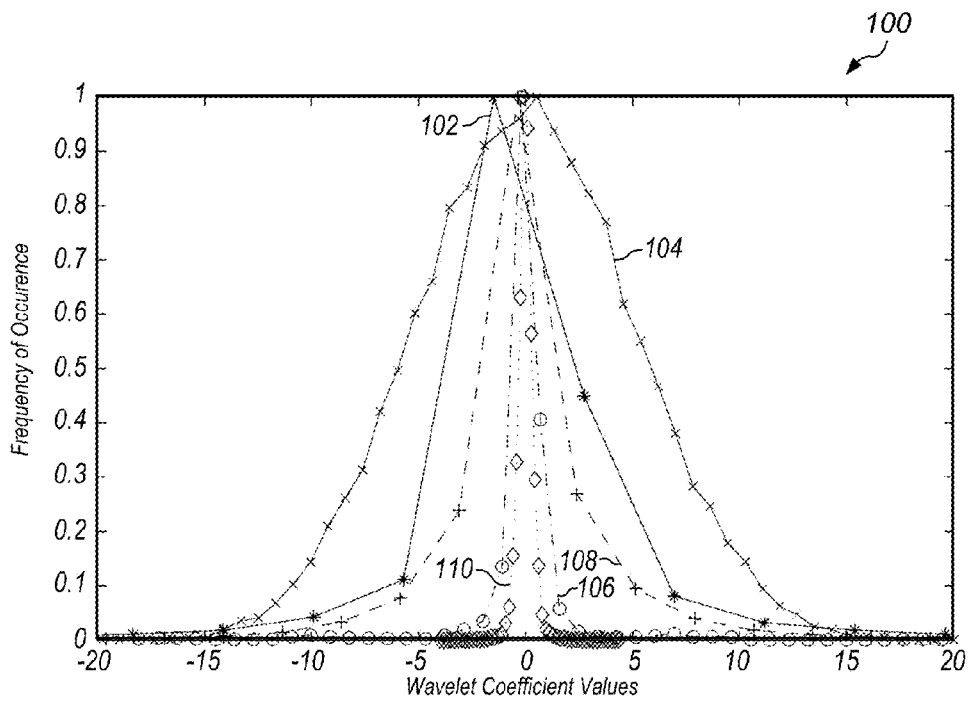
FIG. 1 is a graph showing histograms of coefficients from one subband for an original image and its distorted versions (normalized).

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a processor and a storage device . . . ." Such a claim does not foreclose the apparatus from including additional components (e.g., a network interface unit, additional processors, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"First," "Second," etc. As used herein, these terms are used as labels for nouns that they precede, and do not imply any type of ordering (e.g., spatial, temporal, logical, etc.). For example, a "first" (group of) one or more image frames and a "second" (group of) one or more image frames can be used to refer to any two groups of one or more image frames, and does not necessarily imply that one group of image frames was created, received, processed, etc., before the other. In other words, "first" and "second" are descriptors.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, however, A may be determined based solely on B.

"Processor." This term has its ordinary and accepted meaning in the art, and includes a device that is capable of executing instructions. A processor may refer, without limitation, to a central processing unit (CPU), a co-processor, an arithmetic processing unit, a graphics processing unit, a digital signal processor (DSP), etc. A processor may be a superscalar processor with a single or multiple pipelines. A processor may include a single or multiple cores that are each configured to execute instructions.

"One or more image frames." As used herein, this term refers to a still image and/or a video. Thus, one or more image frames may refer to a single still image, a single video, or a combination including one or more still images and one or more videos.

"Automatically." This term has its ordinary and accepted meaning in the art, and includes performing actions without substantial user intervention.

Figure 9A:
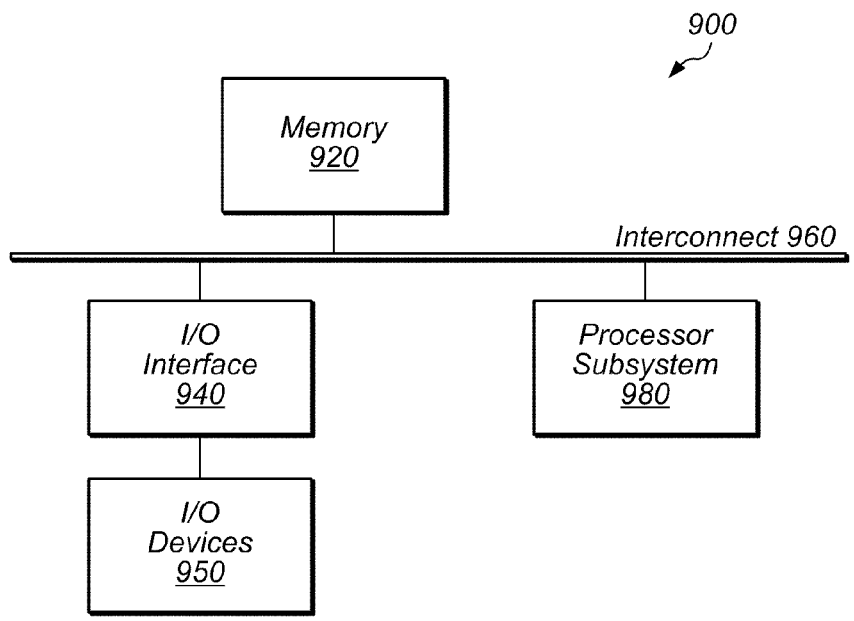
FIG. 9A shows a block diagram of one embodiment of an exemplary computer system.
Figure 9B:
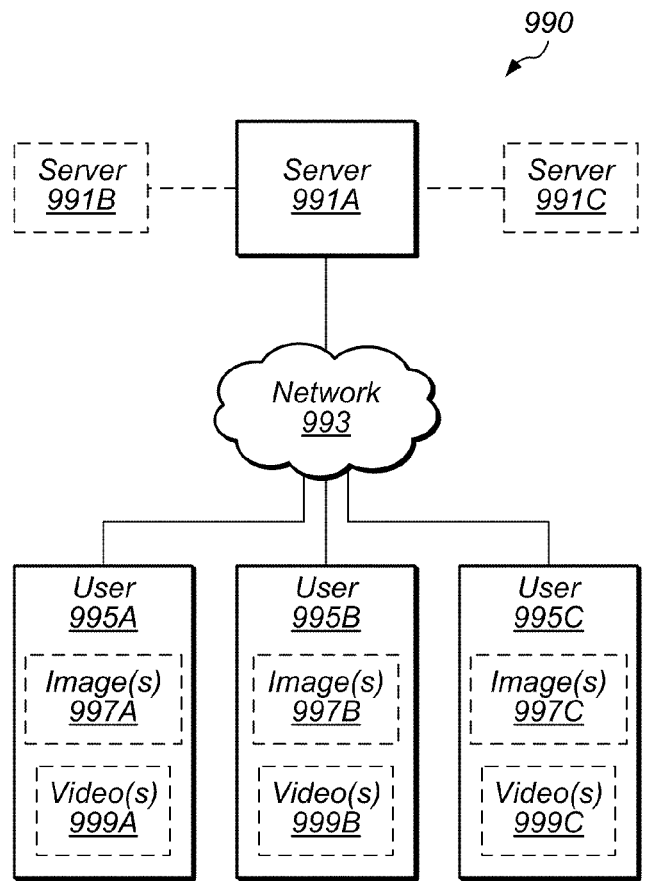
FIG. 9B shows a block diagram of an embodiment configured to operate over a network.
Figure 10:
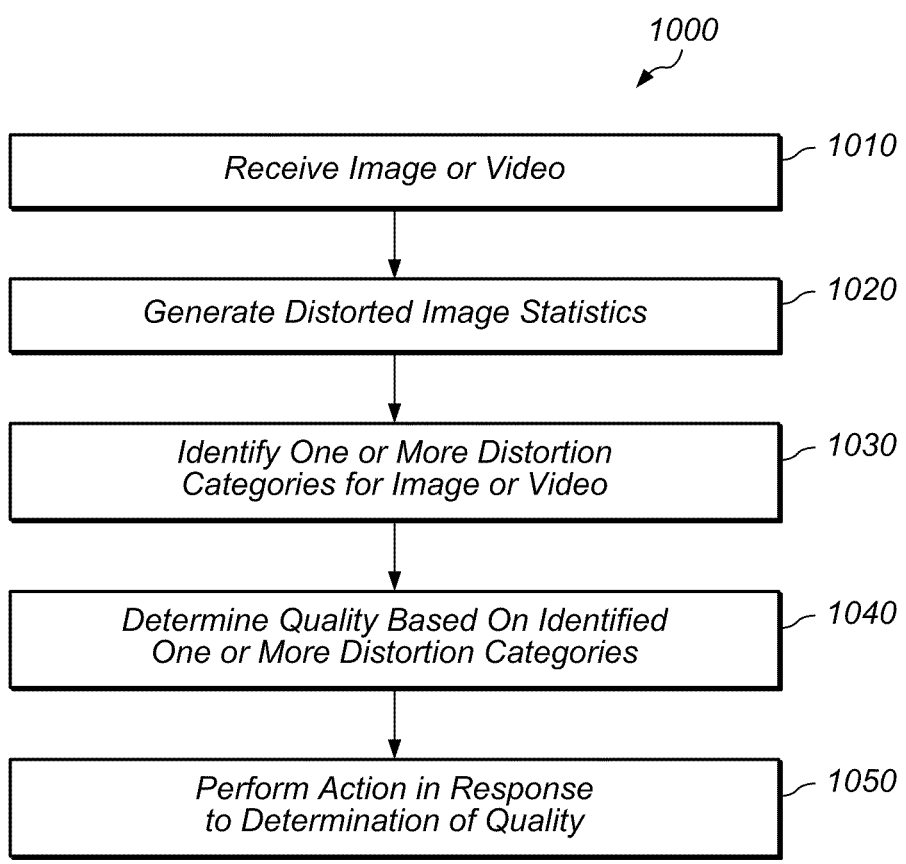
FIG. 10 shows a flowchart of an embodiment of a method for determining quality of an image or video based on one or more identified distortion categories.
Figure 11:
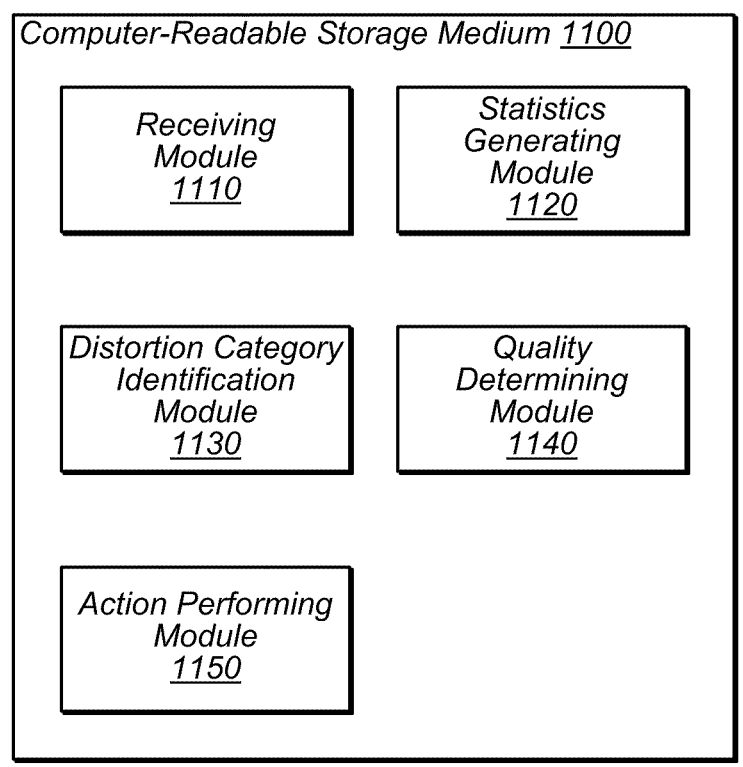
FIG. 11 shows an embodiment of a computer readable medium storing various program modules.

Various embodiments are described herein with regard to FIGS. 1-8, as well as FIGS. 9-11. As further discussed below, the embodiments described and the various features thereof can be combined in any manner as would occur to those of skill in the art. Accordingly, any or all of the features described with respect to the embodiments of FIGS. 1-8 may be combined with any or all of the features described with respect to the embodiments of FIGS. 9-11.

Specific numbers, number ranges, percentages, types of statistical models, etc., may be referred to herein. Such specific references should be understood to be illustrative, and not limiting. For example, while human-assessed quality scores may be referred to in some examples as being on a scale of 0 to 100, other scales (including discrete or non-linear scales) are possible. Similar remarks apply with respect to other specific examples listed herein.

FIGS. 1-8

Characterization of distorted image statistics (DIS) is discussed herein in which there may not only be a characteristic signature for each of a plurality of distortions (or distortion types), but it is also possible to classify an image into a particular distortion category solely based on its subband statistics with high levels of accuracy. Thus, images and videos can be blindly assessed for quality without any knowledge of the distorting medium by (i) identifying the kind of distortion and (ii) using an appropriate quality assessment algorithm to quantify quality based on the distortion. Applications of such categorization are of considerable scope and include DIS-based quality assessment and blind image distortion correction. Moreover, a pristine or undistorted "reference" image is not required for comparison. For example, while some blind image quality assessment algorithms may assume that a distortion form is known (e.g., JPEG) and then proceed to build models to quantify this distortion, in embodiments disclosed herein, it is possible to identify the quality of an image completely blind, i.e., without any knowledge of the distorting source. This identification is possible in some embodiments by predicting (or determining) one or more distortion categories with a high degree of accuracy.

In one embodiment, one or more algorithms for blind Image Quality Assessment (IQA) that are designed for different distortions (e.g. JPEG, JPEG2000, Blur, etc.) are available. In this embodiment, a computer system receives an image or video as an input, classifies it into one of these distortion categories, and then proceeds to determine the quality of the image or video using the methods and algorithms described herein. For image distortion correction, a similar approach is used, since distortion specific approaches exist for this purpose. In some embodiments, DIS techniques may be applied to a wide-range of areas, such as multiply-distorted images and videos (e.g., through repeated iteration or other techniques).

As described herein, scene statistics for distorted images can be used to build a model for classifying a given distorted image by its distortion type. Given a set of distorted images, each of a plurality of distortion types may possess an identifiable statistical signature. Given that such a signature exists, it is possible to build a classifier which is capable of classifying a given image into one of a plurality of distortion classes. This approach can be performed with high accuracy. In one embodiment, a large set of images and four distortion categories with a wide range of distortion severities are provided.

Images used for evaluating statistics may be stored in an image database. In one embodiment, this database consists of eight categories of natural scenes: coast, mountain, forests, open country, streets, city, tall buildings and highways. From each category a plurality of images may be randomly selected for training and a plurality of (different) images may be randomly selected for testing. In this embodiment, each image in the training and test sets is distorted using distortions from a plurality of distortion categories. Distortion categories include white wise (WN), Gaussian blur (GBblur), JPEG compression (JPEG), JPEG2000 (JP2k) compression, as well as any other type of distortion that can be applied to an image or video. In Table 1 below, the four categories shown each included 30 different distortion levels with parameter ranges as shown.

TABLE 1

Table demonstrating minimum and maximum parameter values used for inducing distortions in one embodiment.

| Distortion type & Parameter | Min. Value | Max. Value |
|---|---|---|
| WN ($\sigma^2$ of filter) | 0.001 | 1 |
| Gblur ($\sigma$ of filter) | 0.5 | 8 |
| JPEG (quality parameter) | 10 | 75 |
| JP2k (bit-rate) | 0.05 | 1.75 |

The WN, Gblur and JPEG distortions can be created using any suitable technique (e.g., using the computer program MATLAB™)). In one embodiment, JP2k distortion can be created using the Kakadu encoder. The different levels for each distortion type may be based on equally spaced parameter values between minimum and maximum values (such as those shown in TABLE 1) on a logarithmic scale. Many other spacings or distributions of parameter values can be used in various embodiments, however. Accordingly, parameter values may be selected such that the resulting (distorted) images span a large range of quality so as to cover the space of distortions well. Thus, a total number of images generated for training, in one embodiment, is equal to the number of scene categories (Nscene) times the number of distortion types (Ntypes) times the number of different parameter levels (Nparams), or (Nscene*Ntypes*Nparams). A corresponding plurality of images may be generated similarly for testing. Thus in one embodiment, each distortion category has a total of (Nscene*Nparams) images.

Each created image may be subjected to a wavelet transform over a plurality of scales and orientations (e.g., 3 scales and 3 orientations including horizontal, vertical and diagonal). The wavelet transform may include using the Daubechies 9/7 wavelet basis, or any other wavelet basis usable for image compression, texture analysis, and/or for other purposes. A steerable pyramid can also be used as a transform. In one embodiment, applying a wavelet transform results in a plurality of oriented sub-bands being created. For natural image scenes, the coefficients of each subband may be modeled according to a Laplacian distribution, and one or more particular distributions for subband coefficients of natural images from a space-scale orientation decomposition may exist. As discussed herein, a particular (parameterizable) distribution model for natural images can be used to model the statistics of images distorted with a particular distortion.

Turning to FIG. 1, a diagram of histogrammed coefficients of an image for a particular subband is shown. The shape in FIG. 1 appears to agree with a Laplacian distribution. The figure also shows the distributions of coefficients from the same natural image distorted using the above mentioned distortions for the same subband. It is evident that in FIG. 1, each distortion affects the distribution in a characteristically different way. This may be true across subbands and across images. For example in FIG. 1, WN (104) seems to yield a Gaussian-like distribution while the JP2K (106) histogram is highly peaked. (Note: Gaussian Blur (110), JPEG (108), and the original image (102) are also shown.) As a characteristic signature may exist for each distortion, parameterizing these distributions in some fashion so as to retain these signature while reducing dimensionality.

In natural scene statistics (NSS), there exist various models for the marginal distributions of subband coefficients. One simple model for these coefficients is the generalized Gaussian distribution (GGD). GGD was used to model coefficients from each of the wavelet subbands for each distorted image. The GGD is:

$$f_X(x;\mu,\sigma^2,\gamma)=ae^{-[b|x-\mu|]^\gamma} x\in \Re$$

where, $\mu$, $\sigma^2$ and $\gamma$ are the mean, variance and shape-parameter of the distribution and:

$$a = \frac{\beta\gamma}{2\Gamma(1/\gamma)}, b = \frac{1}{\sigma}\sqrt{\frac{\Gamma(3/\gamma)}{\Gamma(1/\gamma)}}$$

where $\Gamma(\bullet)$ is the gamma function:

$$\Gamma(x)=\int_0^\infty t^{x-1}e^{-t}dt\, x>0$$

In the generalized Gaussian distribution, the shape parameter $\gamma$ controls the "shape" of a given distribution. For example, $\gamma=2$ yields a Gaussian type distribution and $\gamma=1$ yields a Laplacian type distribution. The parameters of the distribution ($\mu$, $\sigma^2$ and $\gamma$) may be estimated using various methods. Since wavelet bases may act as band-pass filters, the responses are zero-mean, hence 2 $\vec{f}_i$| parameters ($\mu$, $\sigma^2$ and $\gamma$) are left for each subband. An 18-dimensional vector (3 scales×3 orientations×2 parameters) may be formed from these estimated parameters, and is a representative feature vector for an image in one embodiment.

Figure 2:
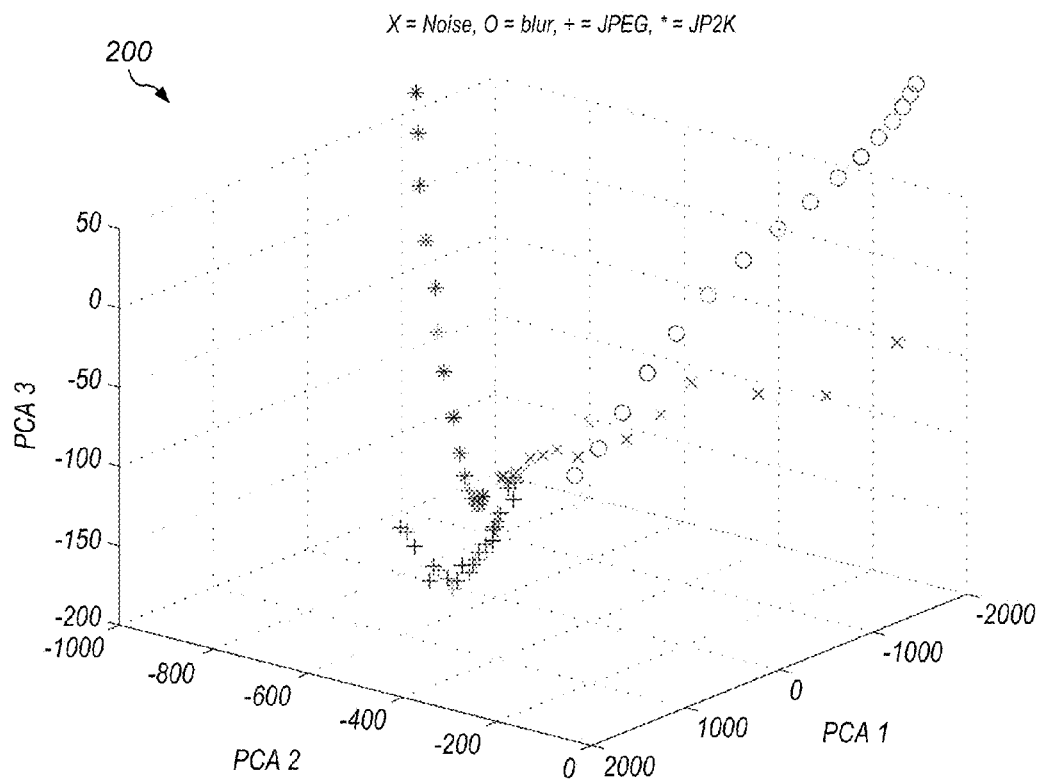
FIG. 2 is a graph showing the three dimensional vectors of distorted image statistics in PCA space.

In order to get a feel for the statistics of these parameters and to visualize the way they vary with each distortion, parameters may be computed across all image database contents (e.g., 80 images in one embodiment) for each distortion type and distortion level. Parameters of the fit may be estimated as described. These parameter-vectors may then be subjected to a principal component analysis (PCA), in order to reduce the dimensionality of the space (e.g., to three dimensions). PCA projects the data onto a space such that the newly formed space accounts for maximum variance in the data. The first dimension may account for the most variance, the second dimension for the next-most variance and so on. A projection onto a 3-dimensional space is made for visualization purposes, and a plot of the 3-dimensional vectors in PCA space is seen in diagram 200 of FIG. 2. In the embodiment of FIG. 2, each point in that figure is an average of statistics of 80 images projected onto a 3-dimensional PCA space. Only a part of the space is shown. As can be easily seen, each distortion follows a particular trend and the parameter-vectors seem to capture this trend well.

Thus, in one embodiment, a large dataset with varied content is created and each image is subjected to various distortions at various severities. Each image thus created is subjected to a wavelet transform in this embodiment, whose coefficient distributions were parametrized using a statistical distribution. The generalized Gaussian distribution (GGD) is one such statistical distribution usable for this purpose, but other statistical distributions may also be used. The parameters of the GGD were estimated and stacked (e.g., concatenated) to form a multi-dimensional feature vector (e.g., 18 dimensions) for each distorted image in the dataset (testing and training)- $\vec{f}_i$, where i={1, 2, . . . Ntot}, where Ntot= (Nscene*Ntypes*Nparams).

In various embodiments, the training vectors are usable to train a classifier such that when the classifier is fed with vectors from a test set, a suitable classification into distortion categories is obtainable, for example. For this purpose a support vector machine (SVM) may be used. SVMs may be used as classifiers since they often perform well in high-dimensional spaces, tend to avoid over-fitting and have good generalization capabilities. Other classifiers are also usable. In one embodiment, a multi-class SVM is trained on a training set consisting of Ntot different feature vectors using the popular LIBSVM software package. A radial basis function (RBF) kernel ($K(x_i;x_j)=\exp(-\gamma|x_{i-x}\|^2)$, $\gamma>0$) may be utilized and its parameters selected using a grid-based 5-fold cross-validation approach on the training set. This trained SVM was then applied as a classifier on a test set consisting of Ntot feature vectors, in one embodiment.

In one embodiment, parameter selection of the SVM during the training phase lead to a cross-validation accuracy of 94.60% with (c, $\gamma$)=(128, 0.056); where c is a penalty parameter for the error term in the minimization function of the SVM. With this kernel in this embodiment, the classification accuracy of test images was 88.5%. TABLE 2 shows the classification accuracy per-category of distortion in this embodiment, wherein WN and Gblur are the easiest to classify while JPEG is seemingly the hardest.

TABLE 2

Classification accuracy on test-set for distortion identification.

| Distortion type | Classification Accuracy |
|---|---|
| WN | 99.17% |
| Gblur | 95.42% |
| JPEG | 74.75% |
| JP2k | 84.67% |
| Overall | 88.5% |

Figure 3:
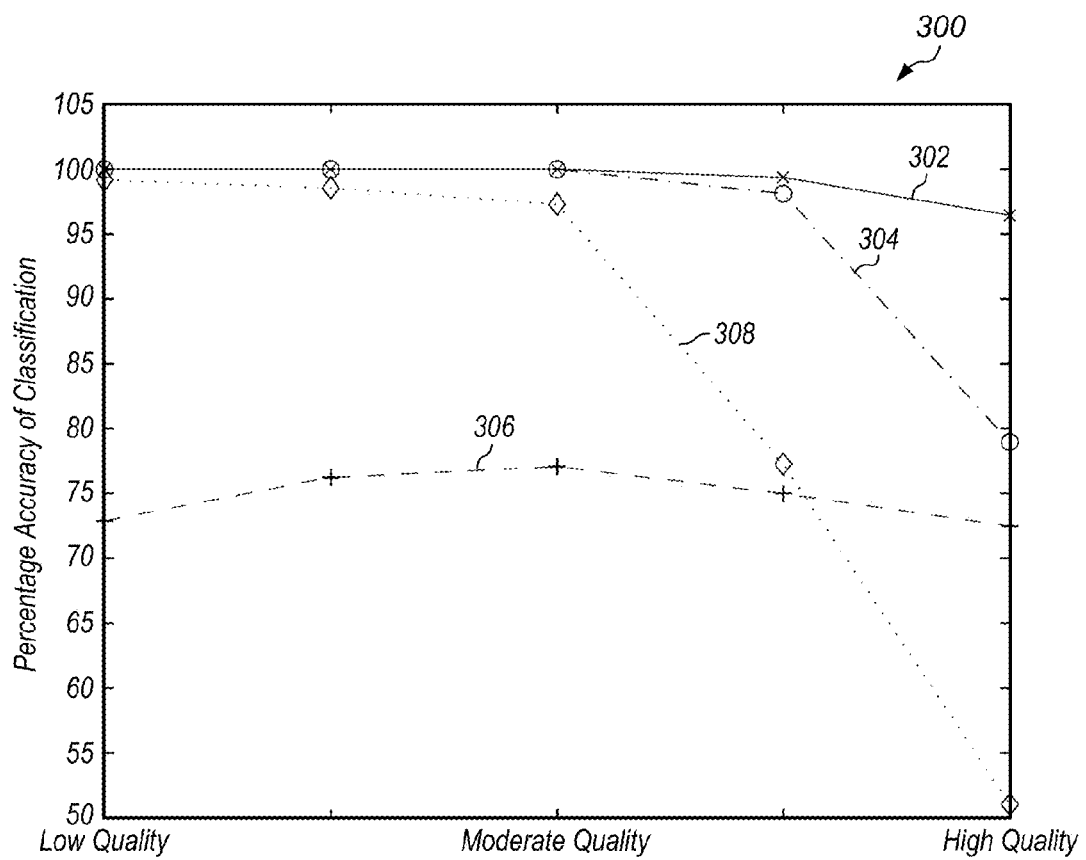
FIG. 3 is a graph showing the classification accuracy of SVM on the test set as a function of quality/distortion severity.

Turning to FIG. 3, a diagram 300 of performance of a classifier as described above on a test set is plotted for five distortion severity levels for a plurality of distortion types: WN (302), Gaussian Blur (304), JPEG (306), and JPEG 2000 (308). In the embodiment of FIG. 3, each set of 6 distortion levels from the plurality of distortion types was clumped into a severity level (to form 5 such quantized 'quality' ranges) and the performance of the classifier was examined for this set of images. As shown in the embodiment of FIG. 3, even though the figure groups all distortions on the same x-axis—low quality (high distortion severity) to high quality (low distortion severity)—this does not imply that these images have the same perceptual quality or that the degradation is the same in any manner. All distortion categories are plotted on the same graph in FIG. 3 due to space constraints. As shown in FIG. 3, performance accuracy falls monotonically for increasing quality.

Figure 4:
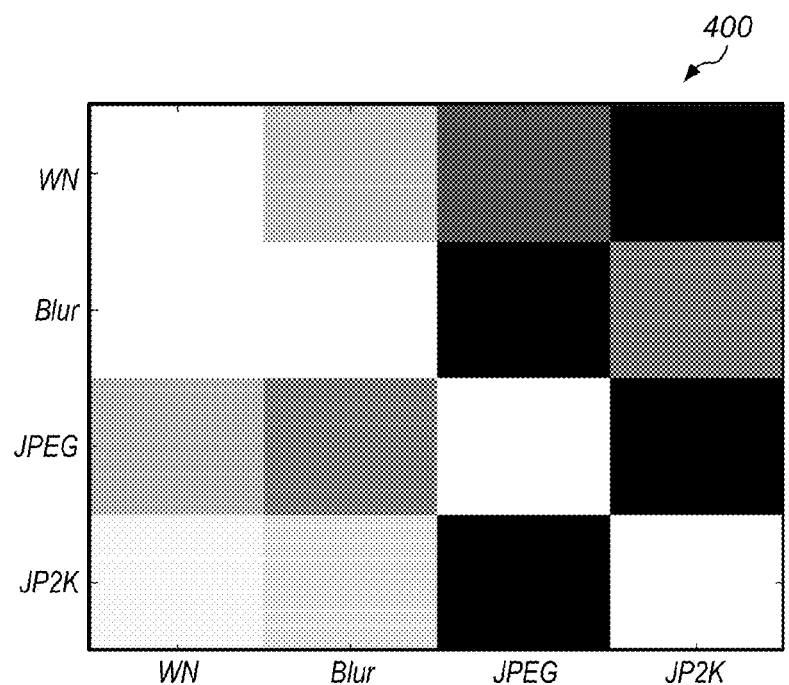
FIG. 4 shows a Confusion Matrix for 'high quality' case—which (row) is confused as which (column) distortion.

In FIG. 4, a 'confusion matrix' 400 is plotted that indicates two sets of classes that are confused the most for the 'high quality' (most misclassified) images in one or more embodiments. Darker value indicates greater number of confused images. Each row is normalized. For example, as shown, Blur is most often misclassified as JPEG, which may be because JPEG compression can induce blur as well as blocking distortions in an image.

Given that overall accuracy of classification may be good and that for high-quality images distortions may not be significant enough to form a characteristic signature in some embodiments, it may be desirable to label some images as "unclassified" in some embodiment. Based on the confusion matrix in FIG. 4, an arbitrary label "unclassified" can be created, and based on some criteria place images in this category can be used to improve classification accuracy, especially for the high-quality case. In order to do this, the probability estimates of an image belonging to a particular class may be extracted from the SVM output. A threshold (t) on the probability p of an image belonging to the output class may be set. In case p is less than the set threshold, the image is re-labeled as unclassified. The results of two such probability thresholds of 0.5 and 0.75 are shown in TABLE 3 along with the total number of images classified after thresholding.

TABLE 3

Classification accuracy on a test set for distortion identification with artificial 'un-classified' class and different probability thresholds.

| Distortion | Accuracy (p ≥ 0.5) | Accuracy (p ≥ 0.75) |
|---|---|---|
| WN | 99.29% | 99.54% |
| Gblur | 95.70% | 97.91% |
| JPEG | 76.24% | 84.23% |
| JP2k | 85.41% | 91.20% |
| Overall | 89.23% | 93.49% |
| Total images | 9522 | 9088 |

Figure 5:
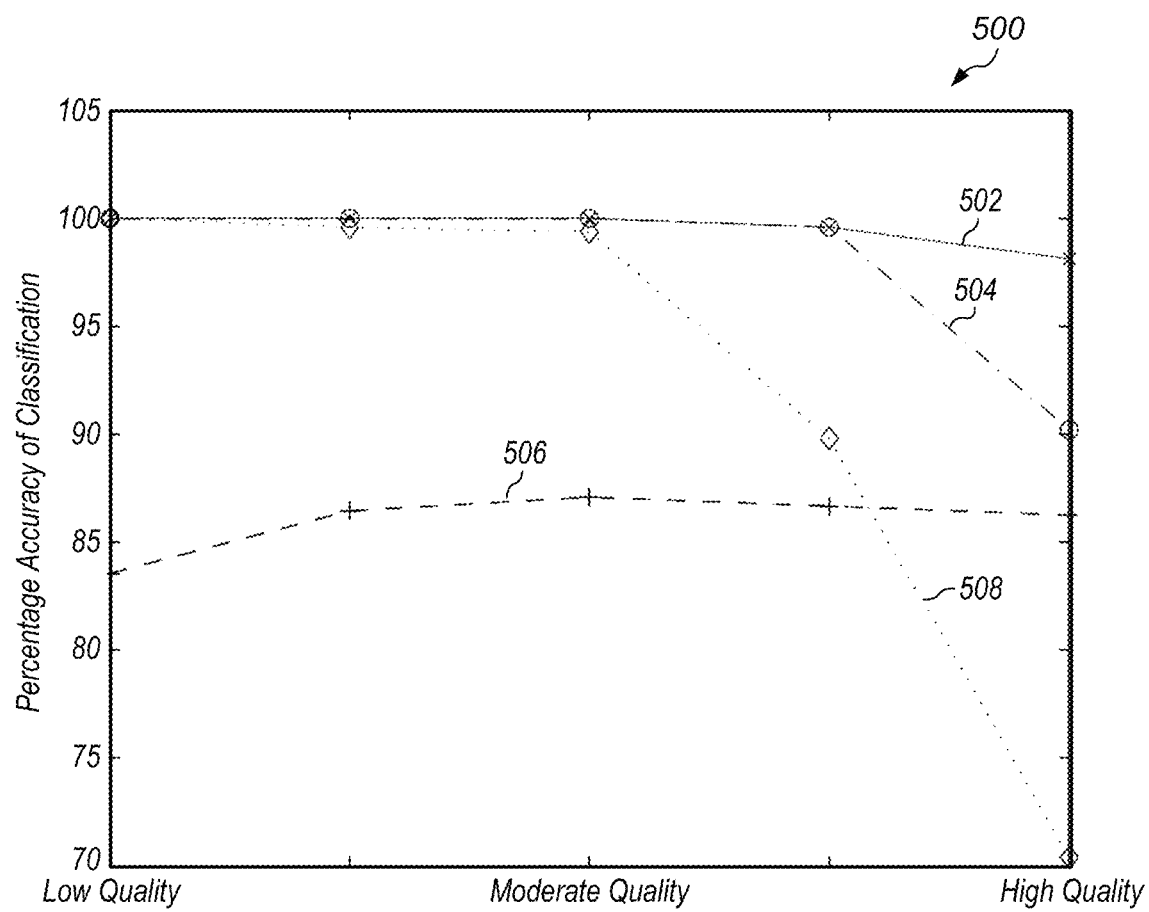
FIG. 5 is a graph show the classification accuracy of SVM on the test set as a function of quality/distortion severity for p≥0.75 with an 'unclassified' category.

Turning to FIG. 5, a diagram 500 shows classification accuracy for each of a plurality of distortions as a function of quality for the p≥0.75 case. Comparing FIG. 3 and FIG. 5, it can be seen that classification performance for high-quality images may improve when the criterion for classification is made stricter, since a class of images may not have perceptually significant distortions. FIG. 5 depicts WN (502), Gaussian Blur (504), JPEG (506), and JPEG 2000 (508).

Alternate classifiers are possible in some embodiments. For example, AdaBoost is usable in one or more embodiments. AdaBoost is a boosting technique used in conjunction with weak classifiers to improve classification performance. AdaBoost is adaptive in the sense that subsequent classifiers built are tweaked in favor of those instances misclassified by previous classifiers. AdaBoost is sensitive to noisy data and outliers. In some simulations, a decision tree was used as the weak classifier and one-vs.-the-rest training since AdaBoost is essentially a 2-class classifier, leading to 4 classifiers—one for each category. In these simulations it was found that with forced categorization into four distortions (based on confidence of returned-class) an overall classification accuracy of 90.41% was achieved for a whole dataset. With the introduction of an artificial 'unclassified' category (where images which each of the four classifiers did not accept as belonging to their 'true' class were placed) accuracy of ≈92% was achieved over 9142 'classified' images in this embodiment.

From the foregoing description it can be seen that in various embodiments, different distortions exhibit different characteristics which systematically modify natural scene statistics (NSS). Distorted image statistics (DIS) for natural images in the wavelet-domain may be evaluated, and the generalized Gaussian distribution may be utilized to parameterize these statistics. Further, a model may be provided for classifying images into specific distortion categories based on their DIS signature in various embodiments, in which the model shows that such a classification may be achieved with high accuracy (≈93.5% in one embodiment). The number of distortions may be increased to make DIS even more comprehensive, and many different types of distortions may be used in various embodiments. Algorithms for blind image quality assessment that use the frame-work of DIS can also be implemented, as for example will be described below.

Figure 6:
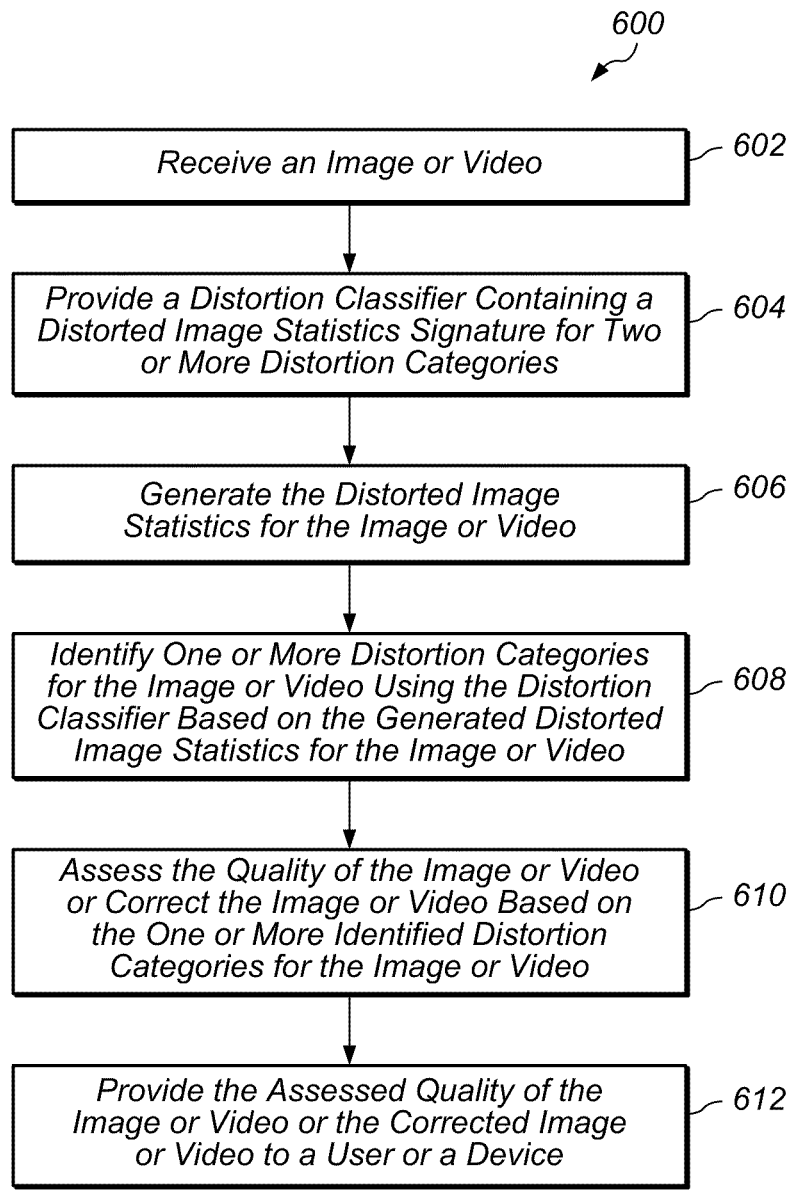
FIG. 6 shows a method for assessing a quality of an image or video or correcting the image or video based a distorted image statistics of the image or video in accordance with one embodiment.

FIG. 6 shows a method 600 for assessing a quality of an image or video or correcting the image or video based a distorted image statistics of the image or video in accordance with one embodiment. Any or all of the steps of method 600 and the features described with respect thereto may be applied in various embodiments of the method 1000 of FIG. 10 (discussed further below).

In the embodiment of FIG. 6, the image or video is received in block 602. A distortion classifier containing a distorted image statistics signature for two or more distortion categories is provided in block 604. The distortion categories may include white noise, filtering distortions (e.g., Gaussian blurring), compression distortions (e.g., wavelet-transform based compression, MPEG (e.g., MPEG 1, 2 or 4), H.26X (e.g., H.263, H.264), Discrete Cosine Transform compressions such as JPEG compression or JPEG2000 compression), and other distortions including unknown or unclassified distortions. The distorted image statistics are generated for the image or video in block 606. One or more distortion categories are identified for the image or video using the distortion classifier based on the generated distorted image statistics for the image or video in block 608. The quality of the image or video is assessed or the image or video is corrected based on the one or more identified distortion categories for the image or video in block 610. The assessed quality of the image or video or the corrected image or video is provided to a user or a device in block 612. The forgoing method can be implemented as a computer program embodied on a computer readable medium that is executable by a processor wherein each step is executed by one or more code segments.

The distorted image statistics for an image or video can be generated by subjecting the image or video to a Wavelet Transformation, such as a Cohen-Daubechies-Feauveau 9/7 wavelet or steerable pyramid. For example, the Wavelet Transformation can be applied over three scales and three orientations (horizontal, vertical, and diagonal) to decompose the image into nine oriented subbands. A marginal distribution of the coefficients from each of the wavelet subbands resulting for subjecting each image to the Wavelet Transformation can be parametrized by fitting the distribution to a Generalized Gaussian Density model. The unclassified distortion category can occur whenever the probability (p) of an image belonging to a particular distortion category is less than a probability threshold (t) on the probability of the image belonging to the known distortion categories. Distorted image statistics for an image for video can also be generated using a discrete cosine transform in various embodiments.

Distortion classifiers can be constructed using one or more supervised, unsupervised, or partially-supervised (combined) machine learning methods, or a combination thereof. Moreover, the distortion classifier can be a Support Vector Machine (SVM), a multi-class SVM, a Neural Network, a k-Nearest Neighbor classifier, a Gaussian Mixture Model (GMM) classifier, a Gaussian classifier, a Naive Bayesian classifier, a Decision Tree or a Radial Basis Function (RBF) classifier. The multi-class SVM can use a Radial Basis Function (RBF) kernel $(K(x_i;x_j)=\exp(-\gamma|x_{i-x}|^2), \gamma>0)$ and its parameters are selected using a grid-based five-fold cross-validation approach on the training set. A machine learning meta-algorithm can also be used.

Figure 7:
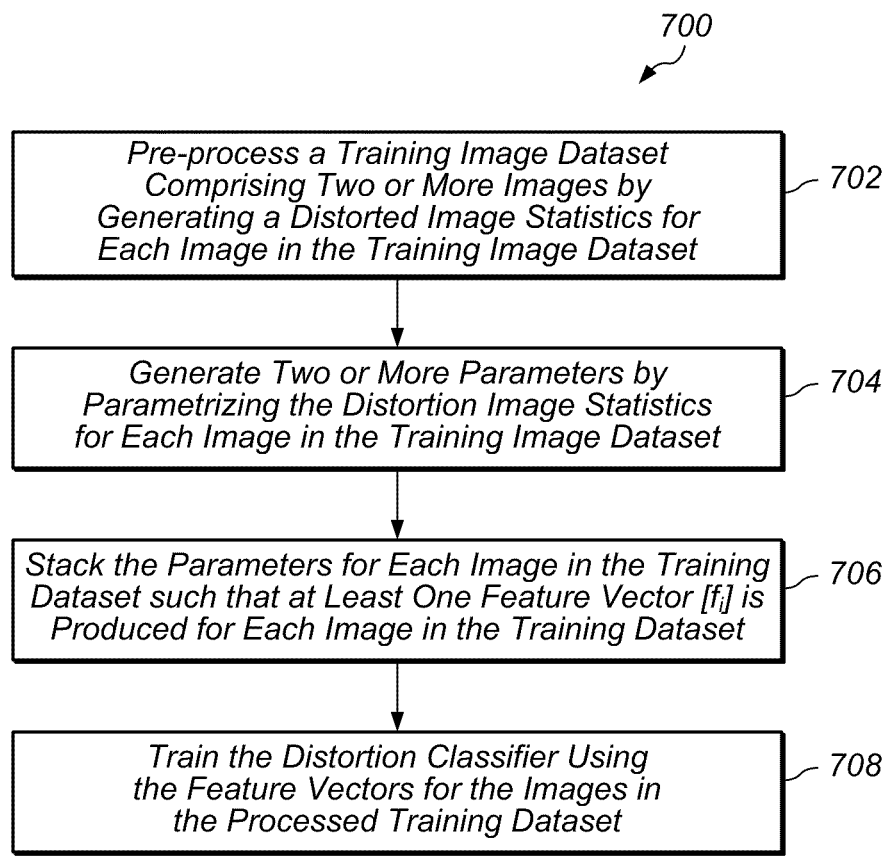
FIG. 7 shows a method 700 for training the distortion classifier in accordance with one embodiment.

FIG. 7 shows a method 700 for training a distortion classifier in accordance with one embodiment. A training image dataset comprising two or more images is pre-processed by generating distorted image statistics for each image in the training image dataset in block 702. Two or more parameters are generated by parametrizing the distortion image statistics for each image in the training image dataset in block 704. The parameters for each image in the training dataset are stacked (i.e., concatenated) such that at least one feature vector $[f_i]$ is produced for each image in the training dataset in block 706. The distortion classifier is trained using the feature vectors for the images in the processed training dataset in block 708. The feature vector $[f_i]$ for each image in the image dataset can be generated by estimating the parameters of a Generalized Gaussian Density model and stacking the parameters to form a multi-dimensional feature vector. For example, the multi-dimensional feature vector may include eighteen parameters, such that the eighteen parameters correspond to two parameters (variance ($\sigma 2$), and shape parameter ($\gamma$)) applied to each of nine subbands (3 scales×3 orientations). The forgoing method can be implemented as a computer program embodied on a computer readable medium that is executable by a processor wherein each step is executed by one or more code segments.

Figure 8:
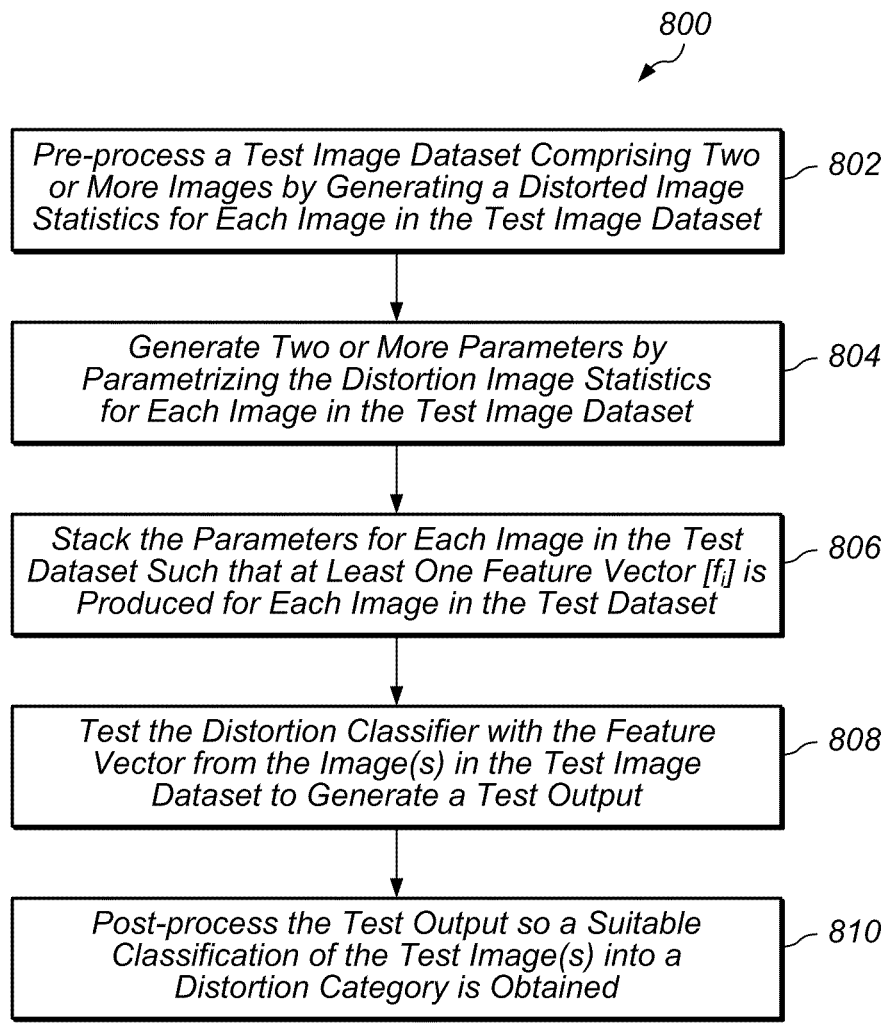
FIG. 8 shows a method 800 for testing the distortion classifier in accordance with one embodiment.

FIG. 8 shows a method 800 for testing a distortion classifier in accordance with one embodiment. A test image dataset comprising at least one image is pre-processed by generating a distorted image statistics for each image in the test image dataset in block 802. Two or more parameters are generated by parametrizing the distortion image statistics for each image in the test image dataset in block 804. The parameters for each image in a test image dataset are stacked such that at least one feature vector $[f_i]$ is produced for each image in the test image dataset in block 806. The distortion classifier is tested with the feature vector from the image(s) in the test image dataset to generate a test output in block 808. The test output is post-processed so a suitable classification of the test image(s) into a distortion category is obtained in block 810. The forgoing method can be implemented as a computer program embodied on a computer readable medium that is executable by a processor wherein each step is executed by one or more code segments.

It should be noted that in various embodiments of the methods described above with respect to FIGS. 6-8, one or more of the elements described may be performed concurrently, in a different order than shown, or may be omitted entirely. Other additional method elements may also be performed as desired. All or a portion of the elements these methods may be performed by a server system 991, client system 995, and/or any other suitable system. In some embodiments, all elements are performed by server 991, while in other embodiments, all elements are performed by client system 995.

FIGS. 9-11

Turning now to FIG. 9A, one embodiment of an exemplary computer system 900 is depicted. Computer system 900 includes all or a portion of computer-readable storage medium 1100 (see FIG. 11) in various embodiments. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, handheld computer, workstation, network computer, a consumer device such as a mobile phone, smart phone, digital camera, or personal data assistant (PDA). Although a single computer system 900 is shown for convenience, system 900 may also be implemented as two or more computer systems operating together.

Processor subsystem 980 may include one or more processors or processing units. For example, processor subsystem 980 may include one or more processing units (each of which may have multiple processing elements or cores), and in various embodiments of computer system 900, multiple instances of processor subsystem 980 may be coupled to interconnect 960. In some embodiments, processor subsystem 980 (or each processor unit or processing element within 980) may contain a cache or other form of on-board memory. In one embodiment, processor subsystem 980 is configured to execute instructions stored on a computer-readable storage medium such as medium 1100.

System memory 920 is usable by processor subsystem 980, and comprises one or more memory elements such as element 180 in various embodiments. System memory 920 may be implemented using different physical memory media, such as hard disk storage, floppy disk storage, removable disk storage, flash memory, random access memory (RAM—static RAM (SRAM), extended data out (EDO) RAM, synchronous dynamic RAM (SDRAM), double data rate (DDR) SDRAM, RAMBUS RAM, etc.), read only memory (ROM—programmable ROM (PROM), electrically erasable programmable ROM (EEPROM), etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices include storage devices (hard drive, optical drive, removable flash drive, storage array, SAN, or their associated controller), network interface devices (e.g., to a local or wide-area network), image or video acquisition devices (scanners, cameras, etc) or other devices (e.g., graphics, user interface devices, etc.). In one embodiment, computer system 900 is coupled to a network via a network interface device. I/O interfaces 940 may include interfaces to a video or image capture device (e.g., webcam, smart phone, etc.) in some embodiments.

Turning now to FIG. 9B, a block diagram 990 of an embodiment configured to operate over a network is shown. As shown, systems 991 and 995 may be any embodiment of a system such as 900. Network 993 can include wireless networks, LANs, WANs, cellular networks, backbones, or any other type of network. Network 993 may include all or a portion of the Internet in some embodiments. Servers 991B and 991C can operate some or all aspects of the software described herein in parallel or in a distributed fashion (e.g., servers may be configured to intercommunicate, and some may perform certain tasks while others perform other tasks). In one embodiment, servers 991 are a server farm for one or more websites (e.g., a website configured to accept uploads of images and/or videos.) In one embodiment, one or more computer servers are configured to perform one or more actions in response to the upload of one or more image frames from a user (as discussed further below with respect to step 1050 in FIG. 10).

In the embodiment of FIG. 9B, user image(s) 997 and video(s) 999 can be any image or video possessed by a user and/or stored on a computer-readable storage medium. Such an image or video may be acquired from an image capture device, and may be encoded and/or distorted according to various formats (JPEG, MPEG, H.26X, etc.). Image(s) 997 and video(s) 999 can be downloaded from an external source, or created or edited by a user of system 995. In some embodiments, image(s) 997 and video(s) 999 represent natural scenes, and may have distorted image statistics generated that are derived from one or more natural scene statistical models. Server systems 991 are also configured to store image(s) 997 and video(s) 999 in various embodiments.

Turning now to FIG. 10, a flowchart of an embodiment of a method 1000 for determining quality of an image or video based on one or more identified distortion categories is shown. It should be noted that in various embodiments of the method described below, one or more of the elements described may be performed concurrently, in a different order than shown, or may be omitted entirely. Other additional method elements may also be performed as desired. All or a portion of the elements of method 1000 may be performed by a server system 991, client system 995, and/or any other suitable system. Thus in some embodiments, all elements are performed by a server 991, while in other embodiments, all elements are performed by a client system 995. In one embodiment, only elements 1030 and 1040 are performed, while in other embodiments, a greater or fewer number of elements may be performed.

In step 1010, one or more images and/or videos (i.e., one or more image frames) are received. The images and/or videos may be received from a network, peripheral storage device, internal storage device (e.g., hard drive) flash memory card, image capture device (camera), or any other source. In one embodiment, an image or video is received from a user via a network, and may be received via a web interface (e.g., one or more web pages configured to accept or facilitate an upload of an image or video). Accordingly, in some embodiments, any portion (or all) of steps 1030 and 1040 may be performed in response to receiving an upload of one or more image frames from a user.

In step 1020, distorted image statistics are generated for one or more image frames. Generation of distorted image statistics can be accomplished in a variety of manners. In one embodiment, a wavelet transformation is applied to the one or more image frames. The wavelet transformation may be a Cohen-Daubechies-Feauveau 9/7 wavelet, a steerable pyramid, or other wavelet transformation. In one embodiment, the distorted image statistics are generated in the space domain only (e.g., the luminance domain). Distorted image statistics may be generated by applying a transformation over a plurality of scales and/or a plurality of orientations to produce a plurality of oriented image sub-bands. For example, in one embodiment, a wavelet transformation is applied over three scales and three orientations (vertical, horizontal, diagonal) to produce a plurality of sub-bands. In some embodiments, distorted image statistics may be generated by a different system, and received for use by a system configured to execute steps 1030 and/or 1040. Generation of distortion statistics may also include generating a histogram. In some embodiments, the histogram is comprised of the count of a plurality of image features from one or more particular image frames. The histogram may adhere to a probability density function model (e.g., such as the Generalized Gaussian Density model).

In step 1030, based on distorted image statistics, one or more distortion categories are identified for the one or more image frames. The identification may be based at least in part on feature scores for a first image or video, as compared to a database of other images or videos for which distortion types are known. For example, the feature scores of an image or video may map to a multidimensional space (e.g., if twelve different feature scores are being used, then a given image or video may have a feature vector of [f1, f2, . . . , f12], where f1 to f12 are different feature scores). Feature scores may tend to be clustered (or have another meaningful mathematical relationship) in one or more dimensions for any given type of distortion, and feature scores may correspond to any image feature as known to those of skill in the art. For example, image features may include parameters of a generalized Gaussian or other distribution fit to histogram data and/or parameterizing the distribution of wavelet coefficients, DCT-domain statistics such as kurtosis of DCT coefficients, Spatial statistics such as distribution of normalized luminance coefficients, etc.). Thus, as further explained below, by analyzing the feature scores of a given image or video, it can be determined whether that given image or video is likely to have been distorted in a particular manner (JPEG image encoding, MPEG or H.26X video encoding, etc.).

In various embodiments, identifying one or more distortion categories for a particular image or video is performed using a distortion classifier, which may be trained. For example, in a given population sample of image frames in which distortion type is known, various feature scores will be differently distributed. Accordingly, for example, with respect to a number of videos in which H.265 compression is used, and for which at least features f1 to fn are scored, it may be the case that each feature score may have its own probability distribution. For example, an f1 feature score between 0.55 and 0.65 may exist for 75% of H.265 videos, while an f2 score between 0.1 and 0.4 exists for 55% of H.265 videos, etc. By harnessing these distributions and using statistical techniques, one or more classifiers (profiles) can thus be developed to fit known distortion types. A distortion classifier may make use of some or all of any number of feature scores (e.g., it is not necessary that a distortion classifier have every single feature score used). However, as will be appreciated by one of skill in the art, any type of distortion classifier may be used, and in various embodiments it need not be a feature-based classifier.

In some embodiments, training a distortion classifier may include taking a plurality of non-distorted or reference images, applying a given distortion to the images, and then attempting to fit functions to the characteristics (e.g., feature vectors) of the distorted images. By increasing the number of reference images and/or getting a better fit, distortion classifiers can be improved in these embodiments. Further, distortion classifier training can be performed iteratively in some embodiments; for example, as additional reference images are made available, they can be distorted according to one or more distortion types and added to a training database, after which the functions and/or algorithms that make up a distortion classifier can be updated. Accordingly, in one embodiment, a distortion classifier that is configured to identify distortion categories based on distorted image statistics can be trained, wherein the training includes applying a given distortion type (e.g. JPEG, MPEG, etc.) to a plurality of reference (undistorted) images to produce a plurality of distorted images, and fitting one or more functions to the plurality of distorted images, wherein the one or more functions are usable to determine a probability that the given distortion type applies to a given distorted image. Function fitting may be done according to various techniques and may depend on feature values for one or more image features (i.e., feature vectors) of the plurality of distorted images.

Further, by analyzing a given image or video with respect to one or more distortion classifiers, it can be determined whether one or more corresponding distortions are deemed to apply to that image or video. A threshold probability (e.g., 90%) for a given classifier may be used in order to reach a determination that the distortion type corresponding to that classifier is believed to be applicable. In some embodiments, multiple distortion types may be assessed and determined.

Turning now to step 1040, a quality is determined based on one or more identified distortion categories for a given image or video. In some embodiments, determining quality is performed by mapping from a multidimensional space (e.g., a feature vector space) to a quality score. Thus, in one embodiment, the multidimensional space is defined by ranges for each of feature scores f1 to fn. Quality mapping functions (e.g., functions that map from feature vector space to a quality score) are also trainable in various embodiments, as described below.

In some embodiments in which quality mapping is used, human quality opinion scores are harnessed. Human quality opinion scores may be generated in a variety of manners and entered into a quality score database in various embodiments. For example, human subjects may be asked to rate images or videos as being between a highest quality and a lowest quality over a 0 to 100 scale. Of course, any number of different rating scales are possible using any number of criteria. A scale could be as simple as "good" (e.g., integer 0) and "not good" (e.g., integer 1). The population of a quality score database can be built up as one or more humans rate images or videos with known distortion types. In some embodiments, multiple human assessments may be made for a same video or image (for example, a single image or video might get a quality score that is a result of any number of different assessments performed by one or more persons).

For example, one portion of a quality score database might comprise 1,000 JPEG images that have been quality-scored twenty-five times apiece. In this quality database, each of the 1,000 JPEG images thus has a particular (average) quality score. In this example, each of the 1,000 JPEG images may also have a corresponding feature vector f1 to fn. Thus, the database would include 1,000 different mappings from an "n-dimension" feature vector space to a single dimension (quality score).

Continuing the above example, suppose that a still image of unknown provenance is analyzed, and it is determined (e.g., via a distortion classifier) that a JPEG distortion has likely been applied to the unknown image at some point. The quality database of human opinion scores for JPEG images may then be consulted with respect to a feature vector f1 to fn for the unknown (no-reference) image. Based on all or a portion of the feature vector f1 to fn, a quality score can be determined by examining the quality database population and/or applying a model derived therefrom. For example, various statistical distributions may be present in a database, such as 65% of JPEG images that have an "f1" feature score range between 0.63 and 0.72 also have human quality scores between 0 and 25, and 43% of JPEG images having an "f6" feature score range between 0.1 and 0.15 have human quality scores between 5 and 30, etc. Based on the statistical distributions of feature scores for JPEG images in the database, and the corresponding mapped human quality scores for those images, an unknown (JPEG) image can be automatically mapped to a quality score based on all or a portion of its feature vector scores. (Thus, a mapping function may use one or more feature vector scores in order to determine a quality score). Accordingly, in one embodiment, determining a quality of one or more image frames includes assessing feature scores for one or more feature vectors (or portions thereof) for the one or more image frames.

In various embodiments, reference image frames for the one or more image frames are not available to a computer system for performing identifying a distortion category and determining a quality. A reference image frame as used herein refers to an image or video of a same scene without one or more distortions being applied. Thus, for example, an uncompressed TIFF image file of a view of the Grand Canyon might be a reference image for a compressed JPEG image file of that Grand Canyon view. As another example, a compressed digital video file that has not been color-balanced may serve as a reference video to a color-balanced version of the compressed digital video file.

A reference image frame may be considered to be unavailable (or "not available") to a computer system for purposes of a calculation, identification, or determination when it is not substantially used to perform the calculation, identification, or determination. For example, when a reference image frame is not accessible via a computer-readable storage medium coupled to the computer system, it can be said to be unavailable to the computer system. A reference image frame may also be said to be unavailable in some embodiments if it is not used except in a trivial, tangential, or peripheral fashion (e.g., results of a calculation, identification, or determination do not substantially depend on the reference image frame).

In step 1050, one or more actions are performed in response to a determination of quality for one or more image frames. A variety of actions may be taken depending on the particular embodiment and/or the goals of the quality assessment. For example, in a website in which users are allowed to upload images or video content, the one or more image frames might be automatically rejected from the system if the image frames fail to meet a certain quality threshold requirement. The one or more image frames might be automatically accepted if they are above a quality threshold, or they might be placed into different portions of a website based on the assessed quality (e.g., highest quality content might be handled in one way, mid-grade quality content handled in another, and low-grade quality content handled in yet another manner). For example, content judged to be high grade might be promoted on the website, while low-grade content might be locatable only through search Additionally, corrections may be performed on one or more image frames in response to the determination of quality, either automatically or via user prompts, according to various known correction techniques (for example, by optimizing the wavelet histograms of a corrected image to match those of an undistorted image; examples of distortion correction for image or video also include denoising, de-blocking, de-blurring or any such image/video enhancement technique). Information or warnings (e.g., of low-grade content quality) may also be provided to users, or otherwise logged or recorded by a computer system (e.g., in a database).

Turning now to FIG. 11, a computer-readable storage medium 1100 is shown. Computer-readable storage medium is configured to store various software modules 1110-1150 in various embodiments. Other modules not depicted may be present, and in various embodiments, only a portion (or none) of any given module may be present on computer-readable storage medium 1100. If executed, the instructions stored in the various modules may cause a computer system (such as 900, 991, and/or 995) to perform one or more actions or operations, as further described below.

In the embodiment of FIG. 11, receiving module 1110 is configured to perform any or all of the steps and/or features described with respect to method step 1010, including receiving one or more image frames (i.e., one or more images or videos). Statistics generating module 1120 may be configured to perform any or all of the steps and/or features described with respect to method step 1020, including generating distorted image statistics for one or more image frames. Distortion category identification module 1130 is configured, in various embodiments, to perform any or all of the steps and/or features described with respect to method step 1030, including identifying one or more distortion categories for a first one or more image frames, wherein the identifying is based on distorted image statistics for the first one or more image frames. Quality determining module 1140 is configured, in various embodiments, to perform any or all of the steps and/or features described with respect to method step 1040, including determining a quality of a first one or more image frames based on an identified one or more distortion categories, wherein said determining is based on a plurality of human-measured quality scores for a plurality of second one or more image frames, wherein each of the plurality of second one or more image frames are classified as being in at least one of the identified one or more distortion categories. Action performing module 1150 is configured, in various embodiments, to perform any or all of the steps and/or features described with respect to method step 1050, including in response to automatically determining quality for each of the plurality of uploaded one or more image frames, automatically perform one or more actions on those one or more image frames.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link. Holographic storage may be used As used herein, the term computer readable storage medium refers to a non-transitory (tangible) medium, and does not include transitory (intangible) media (e.g., a carrier wave).

In various embodiments, one or more portions of the methods and mechanisms described herein may form part of a cloud computing environment. In such embodiments, resources may be provided over the Internet as services according to one or more various models. Such models may include computer infrastructure delivered as a service, and a service provider may host the software, or may deploy the software to a customer for a given period of time. Numerous combinations of the above models are possible and are contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a processor; and
    a storage device having instructions stored thereon that are executable by the processor to cause the apparatus to perform operations including:
        predicting one or more distortion categories from a plurality of distortion categories as having been previously applied to a first one or more image frames, wherein the predicting is based on a comparison of a plurality of image feature scores for the first one or more image frames with a plurality of image feature score ranges that correspond to one or more known distortion categories, wherein the plurality of image feature scores for the first one or more image frames are derived from a natural scene statistics model; and
        determining a quality of the first one or more image frames based on the predicted one or more distortion categories, wherein the determining is based on a plurality of human-measured quality scores for a plurality of second one or more image frames, wherein each of the plurality of second one or more image frames are classified as being in at least one of the predicted one or more distortion categories, and wherein the determining includes a comparison of one or more the plurality of image feature scores for the first one or more image frames with other feature scores for the plurality of second one or more image frames.

2. The apparatus of claim 1, wherein the predicting includes, for a particular distortion category of the plurality of distortion categories, assessing a probability of the particular distortion category being applicable to the first one or more image frames.

3. The apparatus of claim 1, wherein reference image frames for the first one or more image frames are not available to the apparatus in performing the predicting identifying and the determining.

4. The apparatus of claim 1, wherein the operations include receiving an upload of the one or more image frames from a user, and wherein the predicting and the determining are performed automatically in response to the receiving the upload.

5. The apparatus of claim 4, wherein the apparatus includes one or more computer servers configured to couple to a network, and wherein the one or more computer servers are configured to perform one or more actions in response to the upload of the one or more image frames from the user.

6. A computer-readable storage medium having instructions stored thereon that are executable by a computer system to cause the computing device to perform operations comprising:
    predicting one or more distortion categories from a plurality of distortion categories as having been previously applied to a first one or more image frames, wherein the predicting is based on a comparison of a plurality of image feature scores for the one or more image frames with a plurality of image feature score ranges that correspond to one or more known distortion categories; and
    determining a quality of the first one or more image frames based on the predicted one or more distortion categories, wherein said determining is based on a plurality of human-measured quality scores for a plurality of second one or more image frames, wherein each of the plurality of second one or more image frames are classified as being in at least one of the identified one or more distortion categories, and wherein the determining includes a comparison of one or more of the plurality of image feature scores for the first one or more image frames with other feature scores for the plurality of second one or more image frames.

7. The computer-readable storage medium of claim 6, wherein the predicting one or more distortion categories is performed using a distortion classifier for natural scene statistics.

8. The computer-readable storage medium of claim 6, wherein at least one of the plurality of image feature scores is generated by applying a discrete cosine transform to the first one or more image frames.

9. The computer-readable storage medium of claim 6, wherein reference image frames for the first one or more image frames are not available to the computer system in performing the predicting and the determining.

10. The computer-readable storage medium of claim 6, wherein the instructions are executable by the computer system to cause the computing device to:
    receive a plurality of uploaded one or more image frames from a plurality of users via a web interface; and
    automatically determine quality for the plurality of uploaded one or more image frames.

11. The computer-readable storage medium of claim 10, wherein the instructions are executable by the computer system to cause the computing device to, in response to automatically determining quality for each of the plurality of uploaded one or more image frames, automatically perform one or more actions on those one or more image frames.

12. A method, comprising:
a computer system predicting one or more distortion categories from a plurality of distortion categories as having been previously applied to a first one or more image frames, wherein the predicting is based on a comparison of a plurality of image feature scores for the first one or more image frames with a plurality of image feature score ranges that correspond to one or more known distortion categories; and
the computer system determining a quality of the first one or more image frames based on the predicted one or more distortion categories, wherein said determining is based on a plurality of human-measured quality scores for a plurality of second one or more image frames, wherein each of the plurality of second one or more image frames are classified as being in at least one of the identified one or more distortion categories, and wherein the determining includes a comparison of one or more of the plurality of image feature scores for the first one or more image frames with other feature scores for the plurality of second one or more image frames.

13. The method of claim 12, wherein the predicting one or more distortion categories is performed using a distortion classifier for natural scene statistics.

14. The method of claim 12, wherein at least one of the plurality of image feature scores is generated by applying a discrete cosine transform to the first one or more image frames.

15. The method of claim 12, wherein reference image frames for the first one or more image frames are not available to the computer system in performing the identifying and the determining.

16. The method of claim 12, wherein the predicting and the determining are performed in response to receiving an upload of the first one or more image frames from a user.

17. The method of claim 12, wherein determining a quality of the first one or more image frames includes:
mapping from a multidimensional space to a quality score, wherein the multidimensional space is defined by the plurality of image feature score ranges.

18. The method of claim 12, further comprising the computer system performing one or more corrections on the first one or more image frames, wherein performing the one or more corrections is in response to determining the quality of the one or more image frames and is based on the predicted one or more distortion categories.

19. The method of claim 12, further comprising the computer system:
receiving a plurality of uploaded one or more image frames from a plurality of users via a web interface; and
automatically determining quality for the plurality of uploaded one or more image frames.

20. The method of claim 19, further comprising the computer system, in response to automatically determining quality for each of the plurality of uploaded one or more image frames, automatically performing one or more actions on those one or more image frames.

21. The method of claim 20, wherein the one or more actions include classifying individual ones of the plurality of uploaded one or more image frames as being of an acceptable level of quality.

* * * * *